(12) United States Patent
Guo

(10) Patent No.: US 11,917,609 B2
(45) Date of Patent: Feb. 27, 2024

(54) JOINT ALLOCATION OF TRANSMISSION POWER AND TIME RESOURCE

(71) Applicant: NOKIA SOLUTIONS AND NETWORKS OY, Espoo (FI)

(72) Inventor: Haiyou Guo, Shanghai (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 470 days.

(21) Appl. No.: 17/270,669

(22) PCT Filed: Aug. 29, 2018

(86) PCT No.: PCT/CN2018/102939
§ 371 (c)(1),
(2) Date: Feb. 23, 2021

(87) PCT Pub. No.: WO2020/042008
PCT Pub. Date: Mar. 5, 2020

(65) Prior Publication Data
US 2021/0345365 A1    Nov. 4, 2021

(51) Int. Cl.
*H04W 72/12* (2023.01)
*H04W 72/04* (2023.01)
(Continued)

(52) U.S. Cl.
CPC ..... *H04W 72/1263* (2013.01); *H04W 52/367* (2013.01); *H04W 72/0446* (2013.01); *H04W 72/0453* (2013.01); *H04W 72/569* (2023.01)

(58) Field of Classification Search
CPC ........... H04W 72/1263; H04W 72/569; H04W 52/367; H04W 72/0446; H04W 72/0453
(Continued)

(56) References Cited

U.S. PATENT DOCUMENTS

| | | | |
|---|---|---|---|
| 2015/0094113 A1* | 4/2015 | Li | H04W 52/246 455/522 |
| 2015/0110023 A1 | 4/2015 | Pan et al. | |

(Continued)

FOREIGN PATENT DOCUMENTS

| | | |
|---|---|---|
| CN | 104469824 A | 3/2015 |
| CN | 105191189 A | 12/2015 |

(Continued)

OTHER PUBLICATIONS

Extended European Search Report dated Mar. 1, 2022 corresponding to European Patent Application No. 18932029.4.

(Continued)

*Primary Examiner* — Faisal Choudhury
(74) *Attorney, Agent, or Firm* — SQUIRE PATTON BOGGS (US) LLP

(57) ABSTRACT

A method, network device and computer readable storage media can provide joint allocation of transmission power and time resource in a dynamic Time Division Duplex (TDD) communication system. In example embodiments, a minimum time resource assignment of uplink and downlink transmissions required by their respective given traffic demands under a given time resource configuration and a given bandwidth configuration is determined for terminal devices served by a network device. An optimal time resource assignment of the uplink and downlink transmissions is determined under the given bandwidth configuration based on the minimum time source assignment by means of an optimal incremental method. An optimal transmission power assignment of the uplink and downlink transmissions is determined based on the optimal time resource assignment. A joint allocation of transmission power and time resource can thus be implemented, which could minimize (Continued)

transmission power over the allocated time resource while meeting given traffic demands.

13 Claims, 6 Drawing Sheets

(51) Int. Cl.
    *H04W 72/1263*     (2023.01)
    *H04W 52/36*     (2009.01)
    *H04W 72/0446*     (2023.01)
    *H04W 72/0453*     (2023.01)
    *H04W 72/566*     (2023.01)

(58) Field of Classification Search
    USPC .......................................................... 370/329
    See application file for complete search history.

(56) References Cited

U.S. PATENT DOCUMENTS

| | | |
|---|---|---|
| 2015/0341866 A1 | 11/2015 | Park et al. |
| 2017/0111160 A1 | 4/2017 | Chen et al. |
| 2017/0111926 A1 | 4/2017 | Madan et al. |
| 2017/0332333 A1 | 11/2017 | Santhanam et al. |
| 2019/0327716 A1* | 10/2019 | Wang .................. H04B 17/364 |
| 2020/0120647 A1* | 4/2020 | Zhang .................. H04W 72/23 |

FOREIGN PATENT DOCUMENTS

| | | |
|---|---|---|
| CN | 105940631 A | 9/2016 |
| CN | 108282879 A | 7/2018 |
| JP | 2017-204742 A | 11/2017 |
| WO | 2015/047184 A1 | 4/2015 |
| WO | WO 2016/130960 A1 | 8/2016 |
| WO | WO 2017/032408 A1 | 3/2017 |
| WO | WO 2018/031327 A1 | 2/2018 |

OTHER PUBLICATIONS

International Search Report and Written Opinion dated May 15, 2019 corresponding to International Patent Application No. PCT/CN2018/102939.

Chinese Office Action issued in corresponding Chinese Patent Application No. 201880097033.9 dated Aug. 11, 2023.

MediaTek Inc., "Interference Mangement of TDD eIMTA", 3GPP TSG-RAN WG1 Meeting #72bis, Chicago, USA, Apr. 15-19, 2013, R1-131175, 3 pages.

ZTE, ZTE Microelectronics, "Discussion on Measurement and RS Design for CLI Mitigation", 3GPP TSG RAN WG1 AH_NR#1 Meeting, Spikane, Washington, USA, Jan. 16-20, 2017, R1-1700271, 8 pages.

* cited by examiner

JOINT ALLOCATION OF TRANSMISSION POWER AND TIME RESOURCE

FIELD

Embodiments of the present disclosure generally relate to the field of communication systems, and in particular, to a method, network device and computer readable storage media for joint allocation of transmission power and time resource for dynamic Time Division Duplex (TDD) communication system.

BACKGROUND

New radio access system, which is also called as NR system or NR network, is the next generation communication system. In Radio Access Network (RAN) #71 meeting for the third generation Partnership Project (3GPP) working group, study of the NR system was approved. The NR system will consider frequency ranging up to 100 Ghz with an object of a single technical framework addressing all usage scenarios, requirements and deployment scenarios defined in Technical Report TR 38.913, which includes requirements such as enhanced mobile broadband, massive machine-type communications, and ultra-reliable and low latency communications.

In order to better handle the high traffic dynamics, a scheme called as dynamic TDD is proposed. With the dynamic TDD, the network can dynamically use resources for either uplink (UL) transmission or downlink (DL) transmission to match the instantaneous traffic condition, which thus leads to improvement of the end-user performance, compared to the conventional scheme of static resource split between UL transmission and DL transmission.

To utilize these benefits, LTE release 12 includes support for dynamic TDD, which is called as enhanced interference mitigation and traffic adaptation (eIMTA) as its official name in 3GPP. In the 3GPP, it adopts a solution in which the UL/DL allocation is signaled at the beginning of each frame or at the beginning of a set of frames to enable dynamically varying UL/DL usage.

With the introduction of eIMTA, the UL/DL configuration is not static but can vary on a frame-by-frame basis. This could be handled by the network which could broadcast the current UL/DL configuration to users for each frame. The broadcasting allows the UL/DL configuration to change and meet different requirements on UL and DL traffic. In addition, for eIMTA, a frame structure is also designed with flexible subframes. In one radio frame, subframes {#3, #4, #8, and #9} are defined as flexible subframes in which UL/DL configuration is allowed to vary on a frame-by-frame basis.

In release 16, an evolution of dynamic TDD have been discussed and planned for release 16 study item. The Rel-15 NR TDD frame structure is rather flexible, allowing for DL-only slots, UL-only slots, and bi-directional slots, which are combined to form radio frames. In NR, Orthogonal Frequency Division Multiplexing (OFDM) symbols in a slot can be classified as 'downlink', 'flexible', or 'uplink', as the slot format.

However, the dynamic TDD introduces new type of inter-cell interference-cross link interference (CLI). The misalignment in link direction among the neighboring cells raises the detrimental UE-UE (User Equipment) and TRP-TRP (Transmission Reception Point) interference. The CLI is prone to causing the majority of transmission failure in the dynamic TDD system.

SUMMARY

In general, example embodiments of the present disclosure provide a method, network device and computer readable storage media for joint allocation of transmission power and time slots for a dynamic TDD system.

In a first aspect, there is provided a method for joint allocation of transmission power and time resource in dynamic TDD communication system. In the method, at a network device, a minimum time resource assignment of uplink and downlink transmissions required by their respective given traffic demands under a given time resource configuration and a given bandwidth configuration is determined for terminal devices served by the network device; an optimal time resource assignment of the uplink and downlink transmissions is determined for their respective given traffic demands under the given bandwidth configuration based on the minimum time source assignment by means of an optimal incremental method; and an optimal transmission power assignment of the uplink and downlink transmissions is further determined based on the optimal time resource assignment.

In a second aspect, there is provided a network device for joint allocation of transmission power and time resource in dynamic TDD communication system. The network device comprises at least one processor; and at least one memory including computer program code. The at least one memory and the computer program code is configured to, with the at least one processor, cause the network device to: determine, for terminal devices served by the network device, a minimum time resource assignment of uplink and downlink transmissions required by their respective given traffic demands under a given time resource configuration and a given bandwidth configuration; determine optimal time resource assignment of the uplink and downlink transmissions for their given traffic demands under the given bandwidth configuration based on the minimum time source assignment by means of an optimal incremental method; and determine an optimal transmission power assignment of the uplink and downlink transmissions based on the optimal time resource assignment.

In a third aspect, there is provided a computer readable storage medium having a computer program stored thereon. The computer program, when executed by a processor, causes the processor to carry out the method according to the first aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
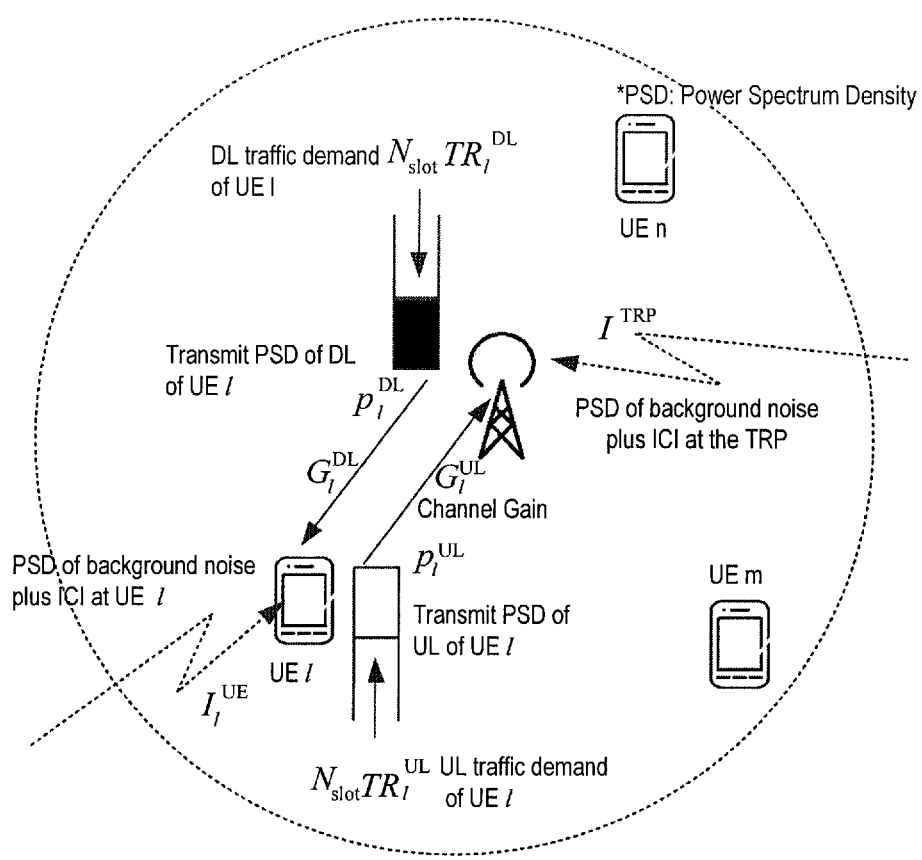
FIG. 1 schematically illustrates a single cell system model of a dynamic TDD communication system.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "communication network" refers to a network that follows any suitable communication standards or protocols such as long term evolution (LTE), LTE-Advanced (LTE-A) and 5G New Radio (NR), and employs any suitable communication technologies, including, for example, Multiple-Input Multiple-Output (MIMO), OFDM, time division multiplexing (TDM), frequency division multiplexing (FDM), code division multiplexing (CDM), Bluetooth, ZigBee, machine type communication (MTC), enhanced Mobile Broadband (eMBB), massive Machine Type of Communication (mMTC) and ultra Reliable & Low Latency Communication (uRLLC) technologies. For the purpose of discussion, in some embodiments, the LTE network, the LTE-A network, the 5G NR network or any combination thereof is taken as an example of the communication network.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like. For the purpose of discussion, in some embodiments, the eNB is taken as an example of the network device.

The network device may also include any suitable device in a core network, for example, including multi-standard radio (MSR) radio equipment such as MSR BSs, network controllers such as radio network controllers (RNCs) or base station controllers (BSCs), Multi-cell/multicast Coordination Entities (MCEs), Mobile Switching Centers (MSCs) and MMEs, Operation and Management (O&M) nodes, Operation Support System (OSS) nodes, Self-Organization Network (SON) nodes, positioning nodes, such as Enhanced Serving Mobile Location Centers (E-SMLCs), and/or Mobile Data Terminals (MDTs).

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, in the following, some embodiments will be described with reference to UEs as examples of the terminal devices, and the terms "terminal device" and "user equipment" (UE) may be used interchangeably in the context of the present disclosure.

As used herein, the term "cell" refers to an area covered by radio signals transmitted by a network device. The terminal device within the cell may be served by the network device and access the communication network via the network device.

As used herein, the term "circuitry" may refer to one or more or all of the following:

(a) hardware-only circuit implementations (such as implementations in only analog and/or digital circuitry); and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s) that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As mentioned in hereinbefore, the dynamic TDD introduces new type of inter-cell interference-cross link interference (CLI). The misalignment in link direction among the neighboring cells raises the detrimental UE-UE (User Equipment) and TRP-TRP (Transmission Reception Point) interference. The CLI is prone to causing the majority of transmission failure in the dynamic TDD system. The CLI can be reduced by minimizing average transmission power over whole time duration, while guaranteeing the graded traffic demands. It is noted that the flexibility in time usage allows for higher efficiency in power usage, which means power assignment and time resource allocation are coupled with each other, and thus embodiments of the present disclosure provide a joint power and time resource allocation for dynamic TDD for minimum power usage.

In dynamic TDD communication system, the allowable time amount for UL/DL is flexible. For given traffic demand, the more time slots (symbols) are assigned for an uplink (UL)/downlink (DL), the less power cost it requires and hence less inter-cell interference (ICI) it causes. All ULs and DLs share and compete for the same set of time slots (symbols), more time resource assigned to a link means less time resource for other links, which will require more power to meet respective traffic demands and cause more interference. For the purpose of CLI mitigation, the joint optimal assignment of time slot and power should be carefully performed to minimize the average transmission power over whole time duration. As a practical constraint, the minimum dividable granularity of time resource or the basic scheduling time unit is a slot (mini-slot or symbols in NR). Such a basic scheduling time unit is an indivisible unit which cannot be shared by different links, which can be called a discrete nature of time resource. Thus, in a joint power and time resource allocation, the discrete nature of time resource shall be considered.

Figure 2:
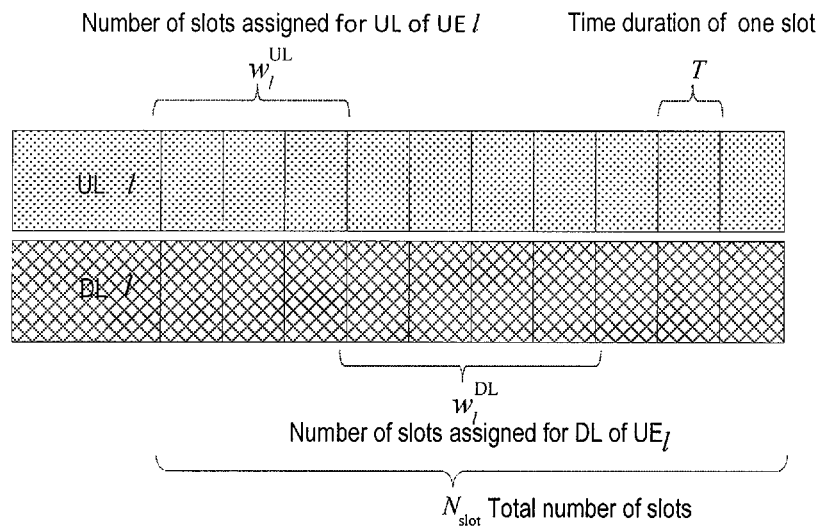
FIG. 2 schematically illustrates time resource configuration and allocation for UL an DL transmission of the terminal devices.

Next, for illustrative purposes, the joint power and time resource allocation problem will be first formulated with reference to FIGS. 1 and 2. As illustrated in FIGS. 1 and 2, a serving cell serves a set of L UEs, denoted by $S_{UE}$ with $|S_{UE}|=L$, in which the time resource is divided into a set of equal sized basic scheduling time units (slots, or mini-slots) of length T second (hereinafter slot will be taken as an example of the basic scheduling time unit for illustrative purposes). Each UE has demands on both UL and DL traffics, and to meet such traffic demands, the total $N_{slot}$ time slots shall be allocated to all UL/DL transmissions and assigned with appropriate power volume.

For the UL and DL of UE $l \in S_{UE}$, their UL and DL traffic demands are supposed to be $R_l^{UL}$ and $R_l^{DL} \in R_{++}$ (in bps), the transmission power spectral density (PSD) assigned for them are $p_l^{UL}$ and $p_l^{DL} \in R_+$ (W/Hz), respectively. Parameters $w_l^{UL}$ and $w_l^{DL}$ denotes the numbers of time slots allocated for the UL and DL of UE l respectively.

Although not limited thereto, Shannon formula can be used to model the data rates (in bps) providing for UL and DL of UE $l \in S_{UE}$, which can be expressed as follows:

$$r_l^{UL} = B_{effective,l}^{UL} w_l^{UL} \log_2\left(1 + \frac{p_l^{UL} G_l^{UL}}{I^{TRP}}\right), l \in S_{UE}$$

$$r_l^{DL} = B_{effective,l}^{DL} w_l^{DL} \log_2\left(1 + \frac{p_l^{DL} G_l^{DL}}{I_l^{UE}}\right), l \in S_{UE}$$

wherein $I^{TRP}$ and $I_l^{UE} \in R_{++}$ (W/Hz) denote the PSD of background noise plus the inter-cell interference measured at the TRP and UE $l \in S_{UE}$, respectively; $B_{effective,l}^{UL}$ ($B_{effective,l}^{DL}$) denotes the effective bandwidth for UL (DL) of UE $l \in S_{UE}$; and $G_l^{UL}$ ($G_l^{DL}$) denotes the UL (DL) channel gain for UE $l \in S_{UE}$. It absorbs the effect of modulation and coding.

Effective bandwidth and channel gain are assumed to be constant over $N_{slot}$ time slots, and channel gain is assumed to be the same across all resource elements over the effective bandwidth as well. Both assumptions are reasonable, since the length of time slot is in ms order and the UEs remain static over the time duration. The aggregate number of assigned time slots cannot exceed the total number $N_{slot}$ of time slots. In particular, $w_l^{UL}$ and $w_l^{DL}$ must take non-negative integer values. In addition, the achieved total data rate of each link must be greater than its traffic demands over $N_{slot}$ time slots. Therefore, the joint power and time slot optimization problem in sense of minimizing the time-average transmission power can be formulated as Problem 1, as follows:

$$\min_{w_l^{DL}, p_l^{DL}, w_l^{UL}, p_l^{UL}} \frac{1}{N_{slot}} \sum_{l \in S_{UE}} B_{effective,l}^{UL} w_l^{UL} p_l^{UL} + B_{effective,l}^{DL} w_l^{DL} p_l^{DL} \quad \text{Problem 1}$$

$$\text{s.t. } B_{effective,l}^{UL} w_l^{UL} \log_2\left(1 + \frac{p_l^{UL} G_l^{UL}}{I^{TRP}}\right) \geq N_{slot} TR_l^{UL}, l \in S_{UE}$$

$$B_{effective,l}^{UL} w_l^{UL} \log_2\left(1 + \frac{p_l^{UL} G_l^{UL}}{I_l^{UE}}\right) \geq N_{slot} TR_l^{DL}, l \in S_{UE}$$

$$\sum_{l \in S_{UE}} w_l^{UL} + w_l^{DL} \leq N_{slot}$$

$$w_l^{UL}, w_l^{DL} \in \{0, 1, 2, \ldots, N_{slot}\}, l \in S_{UE}$$

$$B_{effective,l}^{UL} p_l^{UL} \leq \overline{P}_l^{UE}, l \in S_{UE}$$

$$B_{effective,l}^{DL} p_l^{DL} \leq \overline{P}^{TRP}, l \in S_{UE}$$

where $\overline{P}_l^{UE}$ and $\overline{P}_l^{TRP}$ denote the maximum allowable transmission power for UE $l \in S_{UE}$ and TRP, respectively.

The above Problem 1 can be categorized as a mixed-integer nonlinear programming, which is quite difficult to solve in the sense that it is quite unlikely to have polynomial time algorithms to compute optimal solutions. Generally, a mixed-integer nonlinear programming is non-deterministic polynomial (NP)-hard, which means a prohibitive complexity to compute the optimal solution. Therefore, a linear relaxation method is usually applied to turn the original problem into a pure continuous nonlinear programming, thereby obtaining a relaxed problem. The relaxed problem can be solved by several conventional methods of convex optimization and eventually, a suboptimal discrete solution can be derived by rounding the continuous solution into discrete one.

However, there are some drawbacks for this method. First, the resulted solution is suboptimal since it ignores the discrete nature of time resource allocation, resulting in the unacceptable performance degradation, especially for the large granularity of time slot. Second, the computation complexity is dominated by that of the relaxed problem and thus the general iteration algorithm for the relaxed problem remains complicated.

For these reasons, in practical applications, for such a joint power and time resource allocation, it is usually separated into two decoupled allocation stages, a time slot allocation and a power allocation. In the time slot allocation stage, the time slot allocation is first determined just depending on the traffic demands, and then in the power allocation stage, the power optimization is performed for the determined slot assignments. However, such a separated method cannot make full use of the gain of joint optimization.

To this end, embodiments of the present disclosure provide a fast solution to compute the optimal solution to the joint power and discrete time slot allocation problem in sense of minimizing the power consumption. Particularly, it is proposed to circumvent the complication of implementation, and leverage the inherent separability and convexity to provide a low-complexity incremental method to find out the optimal time slot and power allocation out of all possible combinations.

In embodiments of the present disclosure, the joint optimal problem can be perfectly solved by lossless decoupling between the discrete time slot assignment and power allocation, wherein the discrete nature of time slot is also taken into account. It is shown that the optimal power allocation for each link can be exactly figured out by the optimal amount of time slots assigned to it. An optimal incremental method is further proposed for discrete time slot assignment, wherein an incremental time slot is assigned for a UL or DL of a terminal device that has a desirable decrement in power consumption (for the best performance improvement) benefited from the incremental time slot. Hereinafter, for illustrative purposes, the idea to solve the problem will be described.

Proposed Approach to Problem Solving

Embodiments of the present disclosure make use of the problem structure to equivalently simplify the complicated problem. In Problem 1, it can be observed that constraints on traffic demands must be active at optimum, since transmission power as continuous variable can always be reduced when any one of these constraints is not active. Thus, for the optimal time slot and power allocation, the traffic demands shall be just meet, which means that the following equations hold for the optimal solution:

$$\begin{cases} B^{UL}_{effective,l} w^{UL}_l \log_2\left(1 + \dfrac{p^{UL}_l G^{UL}_l}{I^{TRP}}\right) = N_{slot} TR^{UL}_l, l \in S_{UE} \\ B^{DL}_{effective,l} w^{DL}_l \log_2\left(1 + \dfrac{p^{DL}_l G^{UL}_l}{I^{UE}_l}\right) = N_{slot} TR^{DL}_l, l \in S_{UE} \end{cases}$$

The above equations at optimum show that the optimal power allocation for one link can be accurately calculated from its optimal assignment of time slot, i.e., the optimal power allocation for on link can be determined based on the following equations:

$$p^{UL}_l = \dfrac{I^{TRP}}{G^{UL}_l}\left(2^{\frac{N_{slot} TR^{UL}_l}{B^{UL}_{effective,l} w^{UL}_l}} - 1\right), l \in S_{UE} \quad (1)$$

$$p^{DL}_l = \dfrac{I^{UE}}{G^{DL}_l}\left(2^{\frac{N_{slot} TR^{DL}_l}{B^{DL}_{effective,l} w^{DL}_l}} - 1\right), l \in S_{UE} \quad (2)$$

In view of the fact that the optimal power is decreasing with respect to the amount of time slots, the constraint $$\sum_{l \in S_{UE}} w^{UL}_l + w^{DL}_l \leq N_{slot}$$

must also be active at optimality. Taking into account the limit in transmission power, the required minimum numbers of UL and DL time slot for UE $l \in S_{UE}$ can be respectively expressed by $$w^{UL}_{l,min} = \left\lceil \dfrac{N_{slot} TR^{UL}_l}{B^{UL}_{effective,l} \log_2\left(1 + \dfrac{\overline{P}^{UE}_l G^{UL}_l}{B^{UL}_{effective,l} I^{TRP}}\right)} \right\rceil, l \in S_{UE} \quad (3)$$

and $$w^{DL}_{l,min} = \left\lceil \dfrac{N_{slot} TR^{DL}_l}{B^{DL}_{effective,l} \log_2\left(1 + \dfrac{\overline{P}^{TRP} G^{DL}_l}{B^{DL}_{effective,l} I^{UE}_l}\right)} \right\rceil, l \in S_{UE} \quad (4)$$

where $\lceil x \rceil$ denotes the minimum integer number greater than x. With the above equations (1) and (2), the variables of transmission power in Problem 1 can be eliminated, thereby resulting in an equivalent discrete time slot allocation Problem 2 as follows:

Problem 2

$$\min_{w^{DL}_l, w^{UL}_l} \dfrac{1}{N_{slot}} \sum_{l \in S_{UE}} U^{UL}_l(w^{UL}_l) + U^{DL}_l(w^{DL}_l)$$

$$\text{s.t.} \sum_{l \in S_{UE}} w^{UL}_l + w^{DL}_l = N_{slot}$$

$$w^{DL}_l, w^{UL}_l \in \{0, 1, 2, \ldots, N_{slot}\}, l \in S_{UE}$$

$$w^{UL}_l \geq w^{UL}_{l,min}, l \in S_{UE}$$

$$w^{DL}_l \geq w^{DL}_{l,min}, l \in S_{UE}$$

where $$U^{UL}_l(w^{UL}_l) = B^{UL}_{effective,l} w^{UL}_l \dfrac{I^{TRP}}{G^{UL}_l}\left(2^{\frac{N_{slot} TR^{UL}_l}{B^{UL}_{effective,l} w^{UL}_l}} - 1\right), l \in S_{UE} \quad (5)$$

$$U^{DL}_l(w^{DL}_l) = B^{DL}_{effective,l} w^{DL}_l \dfrac{I^{TRP}}{G^{DL}_l}\left(2^{\frac{N_{slot} TR^{DL}_l}{B^{DL}_{effective,l} w^{DL}_l}} - 1\right), l \in S_{UE} \quad (6)$$

This objective function integrates the information of power allocation, which is convex and separable. It can be also proved that both $U^{UL}_l(w^{UL}_l)$ and $U^{DL}_l(w^{DL}_l)$ are convex in $w^{UL}_l$ and $w^{DL}_l$, respectively. Therefore, the optimal time slot allocation can be determined by solving Problem 2, wherein the simple mathematical structure can be exploited to derive an efficient and optimal algorithm—the optimal incremental method.

Therefore, in embodiments of the present disclosure, the fast computation procedure for joint optimal power and discrete time slot allocation method can be divided into three main stages in order. The first stage is a feasibility checking or a minimum time resource allocation, designed to obtain a minimum time resource allocation meeting the traffic demands while making sure that the allocated bandwidth configuration is enough for the given traffic demands. The second stage is discrete time slot allocation, designed to compute the optimal time slot assignment by means of the incremental method, wherein an incremental time slot is assigned to a favorable UL or DL that has a desirable performance improvement (for example the largest power reduction) benefited from the incremental time slot. The third stage is an optimal power allocation, designed to compute the optimal power allocation based on the obtained optimal time slot assignment.

Hereinafter, details embodiments of the present disclosure will be further described with reference to FIG. 3 to 7 to describe the fast computation method for joint optimal power and discrete time slot allocation. Embodiments of the present disclosure can be implemented at a network device such as a transmission reception point (TRP), or any other network device. In the following description, the TRP will be taken as an example for illustrative purposes, but the skilled in the art could understand that the present disclosure is not limited thereto.

Figure 3:
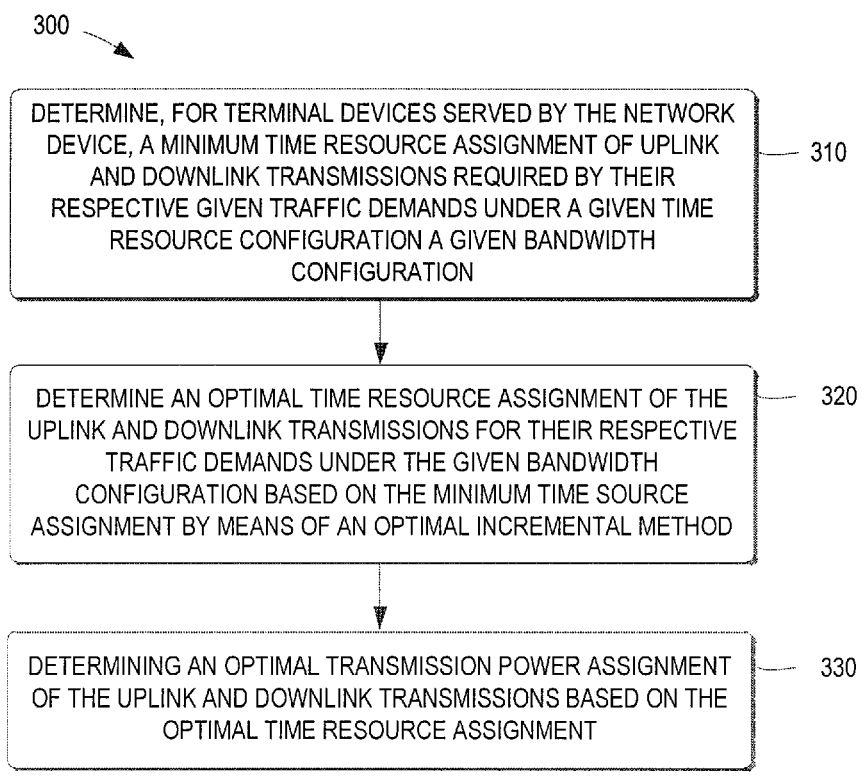
FIG. 3 schematically illustrates an example flow chart of a method of joint allocation of transmission power and time resource in a dynamic TDD communication system according to some embodiments of the present disclosure.

Reference is first made to FIG. 3, which illustrates an example flow chart of a method of joint allocation of transmission power and time resource in a dynamic TDD communication system according to some embodiments of the present disclosure.

As illustrated in FIG. 3, the method 300 starts from step 310, in which the TRP determines, for terminal devices served by the network device, a minimum time resource assignment of uplink and downlink transmissions required by their respective given traffic demands under a given time resource configuration and a given bandwidth configuration. The given time resource configuration means the total amount of time resource allocated to the terminal devices, for example, the total number $N_{slot}$ of time slots. The given bandwidth configuration means configured effective bandwidth for respective terminal device. The given traffic demand means uplink and downlink traffic demands of respective terminal device during time resources configured therefor.

In some embodiments of the present disclosure, the TRP may determine, for the terminal device, a minimum number of uplink basic scheduling time units for UE l∈$S_{UE}$, denoted by $w_{l,min}^{UL}$, and a minimum number of downlink basic scheduling time units for UE l∈$S_{UE}$, denoted by $w_{l,min}^{DL}$, meeting their respective given traffic demands in case of the terminal devices and the network device using their respective maximum transmission powers under the given bandwidth configuration, so that the sum of the minimum numbers of uplink basic scheduling time units $w_{l,min}^{UL}$'s and the minimum numbers of downlink basic scheduling time units $w_{l,min}^{DL}$'s meets the constraint of time resource configuration. In other words, the minimum time resource assignment meeting a given traffic demand is first determined for each terminal device under an assumption that both the terminal device and the network device use their maximum transmission powers under predetermined bandwidth.

In some embodiments of the present disclosure, the TRP may adjust the given bandwidth configuration for at least part of uplink and downlink transmissions to reduce basic scheduling time units assigned thereto to meet constraint of time resource configuration under the adjusted given bandwidth configuration and further determines a new minimum time resource assignment of uplink and downlink transmissions under the adjusted given bandwidth configuration. If the determined minimum time resource assign cannot meet the constraint of time resource configuration under predetermined bandwidth configuration, it may adjust the bandwidth configuration, for example, increase at least part of uplink and downlink transmissions. With an increase in the effective bandwidth, the required time resource will be reduced and thus the basic scheduling time units required can be reduced. In this way, the constraint of time resource configuration might be met under the adjusted given bandwidth configuration. In such a case, a new minimum time resource assignment of uplink and downlink transmissions can be determined under the adjusted bandwidth configuration.

Next, in step 320, the TRP determines an optimal time resource assignment of the uplink and downlink transmissions for their respective given traffic demands under the given bandwidth configuration based on the minimum time source assignment by means of an optimal incremental method.

In embodiments of the present disclosure, the incremental method can be used to determine the optimal time resource assignment from the determined minimum time resource assignment. It can be understood that for the given traffic demand, the more time slots (symbols) are assigned for an uplink (UL)/downlink (DL), the less power cost and hence less inter-cell interference (ICI) it causes. After the minimum time resource assignment, there might be some remaining time resource in the time resource configuration and thus the assignment of the remaining time resource will allow for higher efficiency in power usage, thereby reducing the CLI.

In some embodiments of the present disclosure, for each of remaining basic scheduling time units in the given time resource configuration, TRP allocates it to a transmission link of a terminal device which could achieve a desirable increment in power consumption due to the increment of the allocated basic scheduling time unit. That is to say, for each of the remaining basic scheduling time units, their allocation will perform from the view of performance improvement such that they can be allocated for a higher efficiency in power usage and a lower CLI.

In some embodiments of the present disclosure, the TRP may first determine incremental sequences for the uplink and downlink transmissions of the terminal devices, which measure the incremental gains in power consumption respectively corresponding to the remaining basic scheduling time units. Then, for each of the remaining basic scheduling time units as an incremental basic scheduling time units, the TRP determines a set of values of the incremental sequences of the uplink and downlink transmissions of the terminal devices. After that, the TRP may determine a minimum value among the set of values for the uplink and downlink transmissions of the terminal devices. The TRP could determine the transmission link associated with a terminal device corresponding to the minimum value and determines it as the transmission link of the terminal device to which the incremental scheduling time unit is to be allocated. These operations could be performed repeatedly till all the remaining basic scheduling time units are allocated and thus it may obtain the optimal time resource assignment under the given time resource configuration.

Thereafter, in step 330, the TRP could determine an optimal transmission power assignment of the uplink and downlink transmissions based on the optimal time resource assignment.

As mentioned hereinbefore, for Problem 1, the constraints on traffic demands must be active at optimum, since the transmission power as a continuous variable can always be reduced when any one of these constraints is not active. Thus, for the optimal time slot and power allocation, it shall just meet the traffic demands, and thus, the optimal power allocation can be determined by the optimal time slot allocation and the given traffic demands. For example, it may determine the optimal transmission power assignment of the uplink and downlink transmissions based on the optimal time resource assignment by using equations (1) and (2).

In some embodiments of the present disclosure, transmission power values of the uplink and downlink transmissions for the terminal devices meeting the given traffic demand in case of the terminal devices using the optimal time resource assignment of the uplink and downlink transmissions can be determined as the optimal transmission power assignment.

The TRP may further transmit a transmission resource configuration indicating the determined optimal time resource assignment and the optimal transmission power assignment so that the terminal device can learn the determined optimal time resource and power allocation. Thus, the TRP and the terminal device like UE could transmit UL and DL signals, respectively, based on the optimal time resource and power allocation, i.e., transmitting UL and DL signals within the assigned time resource with the assigned power.

Particularly, this invention proposes a fast method to compute the optimal solution to joint power and discrete time slot allocation problem, modelling as Problem 1. The joint optimal problem is perfect solved by lossless decoupling between the discrete time slot assignment and power allocation. An optimal incremental method is proposed for discrete time slot assignment problem with separable and convex objective function, which is an exact equivalent version reduced from the original problem. The proposed incremental method exploits the separability and convexity in the objective function and leads to polynomial-time computation complexity in $O(2 L+N_{slot} \log 2 L)$.

Figure 4:
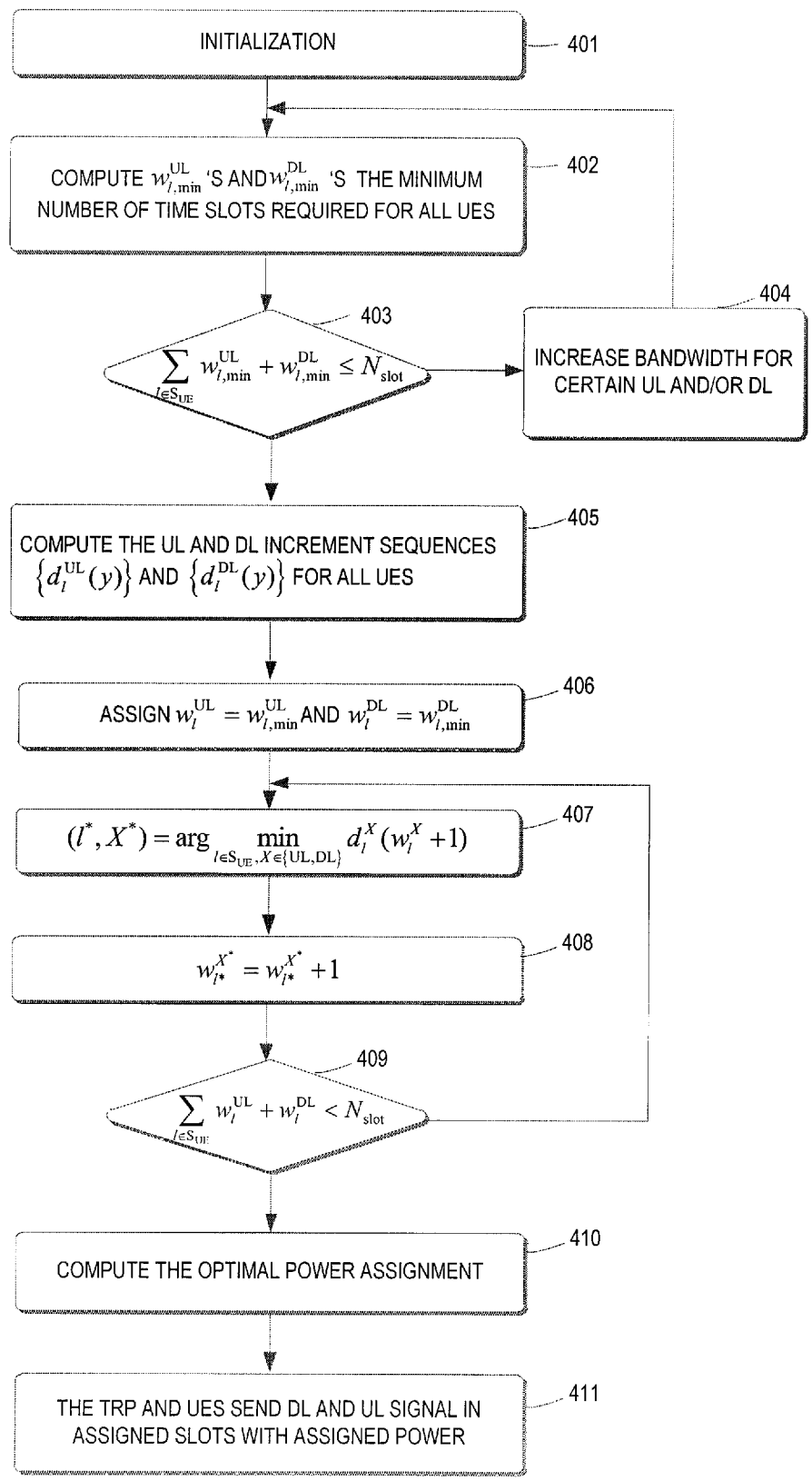
FIG. 4 illustrates a flow chart of a specific implementation of joint allocation of transmission power and time resource in a dynamic TDD communication system according to some embodiments of the present disclosure.

Next, only for illustrative purposes, reference will be made to FIG. 4 to describe a specific implementation of the present disclosure, wherein FIG. 4 illustrates a flow chart of a joint allocation scheme of transmission power and time resource in a dynamic TDD communication system according to some embodiments of the present disclosure.

As illustrated in FIG. 4, the method 400 stars from step 401, in which an initialization procedure is performed. Particularly, the TRP configures time resource, i.e., the total number $N_{slot}$ of time slots to be assigned, bandwidth resource, i.e., bandwidth $B_{effective,l}^{UL}$ and $B_{effective,l}^{DL}$, maximum allowable transmission power $\overline{P}_l^{UE}$ and $\overline{P}_l^{TRP}$, and traffic demands $R_l^{UL}$ and $R_l^{DL}$ for all UEs $l \in S_{UE}$. Meanwhile, the TRP collects the measurements of ICI power $I^{TRP}$ and $I_l^{UE}$, UL and DL channel gains $G_l^{UL}$ and $G_l^{DL}$ for all UEs $l \in S_{UE}$, for further processing in the following steps.

In step 402, the TRP computes $w_{l,min}^{UL}$ and $w_{l,min}^{DL}$, the required minimum numbers of UL and DL time slots for all UEs, wherein $l \in S_{UE}$. This could be implemented based on for example Equations (3) and (4).

Then, the method goes to step 403, the TRP determines whether the sum of all required minimum numbers of UL and DL time slots, i.e. $w_{l,min}^{UL}$'s and $w_{l,min}^{DL}$'s, is less than the total number of time slots to be assigned $N_{slot}$. If so, the method proceeds to step 405. If not, the method goes to step 404, wherein the effective bandwidth $B_{effective,l}^{UL}$, and/or $B_{effective,l}^{DL}$ are increased for transmission links of certain UEs $l \in S_{UE}$ and the method goes back to step 402 in which a new minimum numbers of UL and DL time slots, i.e. $w_{l,min}^{UL}$'s and $w_{l,min}^{DL}$'s, are determined. Steps 402 to 404 are repeated until the minimum numbers $w_{l,min}^{UL}$'s and $w_{l,min}^{DL}$'s meet the constraint $$\sum_{l \in S_{UE}} w_{l,min}^{UL} + w_{l,min}^{DL} \leq N_{slot}.$$

In step 405, the TRP computes the UL and DL increment sequences $\{d_l^{UL}(y)\}$ and $\{d_l^{DL}(y)\}$ for all UEs by $\{d_l^{UL}(y)|d_l^{UL}(y)=U_l^{UL}(y)-U_l^{UL}(y-1), y=w_{l,min}^{UL}+1, w_{l,min}^{UL}+2, \ldots, N_{slot}\}, l \in S_{UE}$ $\{d_l^{DL}(y)|d_l^{DL}(y)=U_l^{DL}(y)-U_l^{DL}(y-1), y=w_{l,min}^{DL}+1, w_{l,min}^{DL}+2, \ldots, N_{slot}\}, l \in S_{UE}.$ In practical application, in order to avoid round-off error due to finite-length expression in Step 405, M-order Taylor series can be used to approximate $U_l^{UL}(w_l^{UL})$ and $U_l^{DL}(w_l^{DL})$ which can be expressed by $$U_l^{UL}(w_l^{UL}) \approx B_{effective,l}^{UL} \frac{I^{TRP}}{G_l^{UL}} \sum_{n=1}^{M} \frac{\left(\frac{N_{slot} TR_l^{UL}}{B_{effective,l}^{UL}} \ln 2\right)^n}{n!} (w_l^{UL})^{1-n}$$

$$U_l^{DL}(w_l^{DL}) \approx B_{effective,l}^{DL} \frac{I^{TRP}}{G_l^{DL}} \sum_{n=1}^{M} \frac{\left(\frac{N_{slot} TR_l^{DL}}{B_{effective,l}^{DL}} \ln 2\right)^n}{n!} (w_l^{DL})^{1-n}.$$

Next, in step 406, the TRP assign $w_l^{UL}=w_{l,min}^{UL}$, and $w_l^{DL}=w_{l,min}^{DL}$ for all UEs $l \in S_{UE}$. Thus, the increment method could start from the determined minimum time slot allocation.

Then, in Step 407, the TRP determines the desired link which has the smallest value in the set $\{d_l^X(w_l^X+1)|l \in S_{UE}, X \in \{UL,DL\}\}$ The desired link is identified in link direction and UE index by $$(l^*, X^*) = \arg\min_{l \in S_{UE}, X \in \{UL,DL\}} d_l^X(w_l^X + 1)$$

where l* indicates the terminal device corresponding to the incremental sequence with the smallest value and X* indicates the transmission link corresponding to the incremental sequence with the smallest value, which can be either UL or DL.

In Step 408, The TRP assigns the desired link with an incremental time slot, i.e. $w_{l^*}^{X^*}=w_{l^*}^{X^*}+1$.

In step 409, the TRP further determines whether there is still time slot remaining in the time resource configuration. For example, it determines whether the sum of the assigned time slots is less than the total number of time slots to be assigned or not. If not, the method proceeds to step 410. If yes, the method proceeds to step 407 to assign the remaining time slots. Steps 407 to 409 are performed repeatedly until all the time slots are used up, i.e., $$\sum_{l \in S_{UE}} w_l^{UL} + w_l^{DL} = N_{slot}.$$

In step 410, the TRP computes the optimal power allocation based on the obtained optimal time slot assignment $w_l^{UL}$ and $w_l^{DL}$ based on equations (1) and (2).

In step 411, the TRP and UEs send DL and UL signals in assigned slots with assigned power based on the determined optimal allocation and time slot allocation.

In essence, the procedure in steps 405-409 is meant to identify the subset that contain $$N_{slot} - \sum_{l \in S_{UE}} w_{l,min}^{UL} + w_{l,min}^{DL}$$

smallest elements in $D^{UL} \cup D^{DL}$, wherein $$D^{UL} = \{d_l^{UL}(y) \mid y = w_{l,min}^{UL} + 1, w_{l,min}^{UL} + 2, \ldots, N_{slot}, l \in S_{UE,n}\}$$

$$D^{DL} = \{d_l^{DL}(y) \mid y = w_{l,min}^{DL} + 1, w_{l,min}^{DL} + 2, \ldots, N_{slot}, l \in S_{UE,n}\}$$

With the incremental method, it may follow the optimal discrete time slot allocation solution for Problem 2 and hence Problem 1. As a result, the whole procedure can be applied to minimize the total transmission power for graded UL/DL traffic demands and mitigate CLI through joint optimal power and discrete time slot allocation.

In the proposed method, step 407 takes the majority of computation load to find out the smallest value out of 2 L numbers. However, step 407 will be executed just $$N_{slot} - \sum_{l \in S_{UE}} w_{l,min}^{UL} + w_{l,min}^{DL}$$

times. This means that the proposed method can be realized with small computational overhead, leading to polynomial-time computation complexity in $O(2 L+N_{slot} \log 2 L)$ and easing the practical implementation.

In addition, simulation results show that the proposed solution of the present disclosure can reduce mean transmission power of BS and UE as desired, respectively, as compared to the separated method. Next, reference will be made to FIGS. 5 and 6 to describe these simulation results.

In some embodiments of the present disclosure, the proposed solution is evaluated through numerical experiment for single cell serving 10 UEs, where the ICI effect is considered by setting $I^{TRP}$ and $I_l^{UE}$ with the constant average power. Two simulation cases are evaluated by setting different traffic demands and detailed simulation conditions are listed in Table 1. Simulation results are obtained by averaging over 10000 independent experiments, each experiment corresponds to a random UE deployment drew from the uniform distribution. Performance comparison is made for a separated method wherein the amount of time slot assigned is proportional to the traffic demands.

TABLE 1

Simulation conditions

| Parameter | value |
| --- | --- |
| Inter-site distance | 500 m |
| Maximum transmission power of BS | 46 dBm |
| Maximum transmission power of UE | 23 dBm |
| Channel model, noise figure, antenna pattern | According to 3GPP TR 36.828 |
| Number of slot to be assigned ($N_{slot}$) | 100 slots |
| Bandwidth | 20 MHz |
| Total ICI power at TRP | 10 dBm over 20 MHz |
| Total ICI power at each UE | 10 dBm over 20 MHz |
| Number of UEs | 10 |
| UL traffic demands for $UE_l$ | $R_l^{UL} = 4l$ (case 1) or $R_l^{UL} = 5l$ bps (case 2) |
| DL traffic demands for $UE_l$ | $R_l^{DL} = 4(11 - l)$ (case 1) or $R_l^{UL} = 5(11 - l)$ bps (case 2) |

Figure 5:
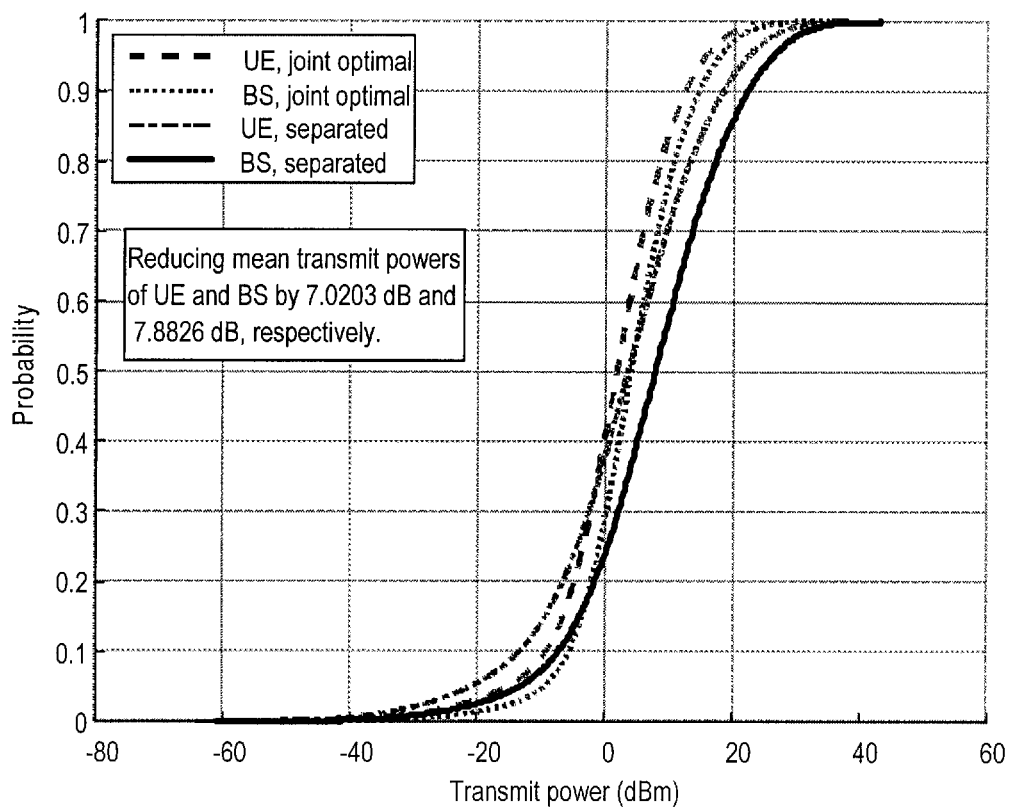
FIGS. 5 and 6 schematically illustrates results of simulation on embodiments of the present disclosure and a separated method in different simulation cases.
Figure 6:
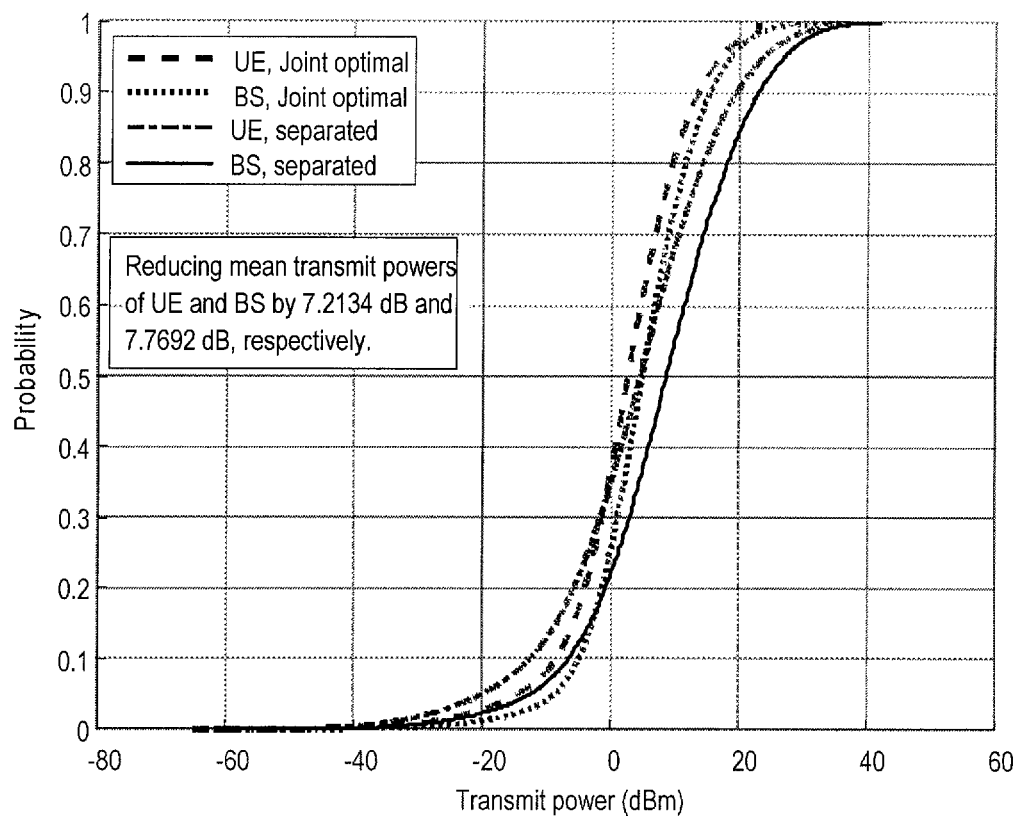

FIGS. 5 and 6 show simulation results for two cases and the separated method, wherein the CDF of transmit powers for UE and BS are given. From FIGS. 5 and 6, it can be seen that that the proposed solution herein can reduce mean transmission power of BS and UE by above 7 dB, respectively, as compared to the separated method. The performance gain is benefitted from the joint optimality in power and time slot allocation Thus, the proposed solution herein is applicable to minimize the total transmission power for graded UL/DL traffic demands and mitigate CLI through joint optimal power and discrete time slot allocation.

Embodiments of the present disclosure provide an optimal increment method to address the joint optimal time resource and power allocation, wherein the performance improvement is achieved by the increment sequence, which is calculated by the separable and convex objective function related to each transmission link. The proposed incremental method exploits the separability and convexity in the objective function and thus leads to polynomial-time computation complexity in O (number of link+number of slots*log (number of links)), which eases practical implementation substantially. In addition, with the proposed method, it could circumvent the prohibitive implementation complexity in joint power and discrete time slot allocation which is generally treated as a complicated mixed-integer nonlinear in the sense that it is quite unlikely to have polynomial time algorithms to compute optimal solutions. It is also demonstrated that the proposed method can achieve the joint optimality in power and discrete time slot allocation for total power minimization.

In some embodiments of the present disclosure, there is further provided an apparatus capable of performing the method 300, and the apparatus could be or function as for example, a network device like the TRP as proposed herein. The apparatus may comprise means for determining, for terminal devices served by the network device, a minimum time resource assignment of uplink and downlink transmissions required by their respective given traffic demands under a given time resource configuration and a given bandwidth configuration; means for determining an optimal time resource assignment of the uplink and downlink transmissions for the given traffic demands under the given bandwidth configuration based on the minimum time source assignment by means of an optimal incremental method; and means for determining an optimal transmission power assignment of the uplink and downlink transmissions based on the optimal time resource assignment.

In some embodiments of the present disclosure, the mean for determining a minimum time resource assignment of uplink and downlink transmissions may be further configured to determine a minimum number of uplink basic scheduling time units and a minimum number of downlink basic scheduling time units for the terminal devices meeting their respective given traffic demands in case of the terminal devices and the network device using their respective maximum transmission powers under the given bandwidth configuration, so that a sum of the minimum numbers of uplink basic scheduling time units and the numbers of downlink basic scheduling time units meets the constraint of time resource configuration.

In some embodiments of the present disclosure, the means for determining a minimum time resource assignment of uplink and downlink transmissions may be further configured to adjust the given bandwidth configuration for at least part of the uplink and downlink transmissions to reduce basic scheduling time units assigned thereto to meet the constraint of time resource configuration under the adjusted given bandwidth configuration; and determine a new minimum time resource assignment of the uplink and downlink transmissions for the terminal devices under the adjusted given bandwidth configuration.

In some embodiments of the present disclosure, the means for determining an optimal time resource assignment of the uplink and downlink transmissions may be further configured to, for each of remaining basic scheduling time units in the given time resource configuration, allocating it to a transmission link of a terminal device which could achieve a desirable decrement in power consumption due to the increment of the allocated basic scheduling time unit.

In some embodiments of the present disclosure, the means for determining an optimal time resource assignment of the uplink and downlink transmissions may be further configured to determine incremental sequences for the uplink and downlink transmissions of the terminal devices, which indicate incremental gains in power consumption respectively corresponding to the remaining basic scheduling time units; and for a remaining basic scheduling time units as an incremental scheduling time unit, determine a set of values of the incremental sequences of the uplink and downlink transmissions of the terminal devices, determine a minimum value among the set of values of the incremental sequences and determine a transmission link associated with a terminal device corresponding to the minimum value as the transmission link of the terminal device to which the incremental basic scheduling time unit is to be allocated.

In some embodiments of the present disclosure, the means for determining an optimal transmission power assignment of the uplink and downlink transmissions may be further configured to determine transmission power values of the uplink and downlink transmissions for the terminal devices meeting their respective given traffic demands in case of the terminal devices using the optimal time resource assignment of the uplink and downlink transmissions, as the optimal transmission power assignment.

In some embodiments of the present disclosure, the apparatus may further comprise means for transmitting a transmission resource configuration indicating the determined optimal time resource assignment and the optimal transmission power assignment.

Figure 7:
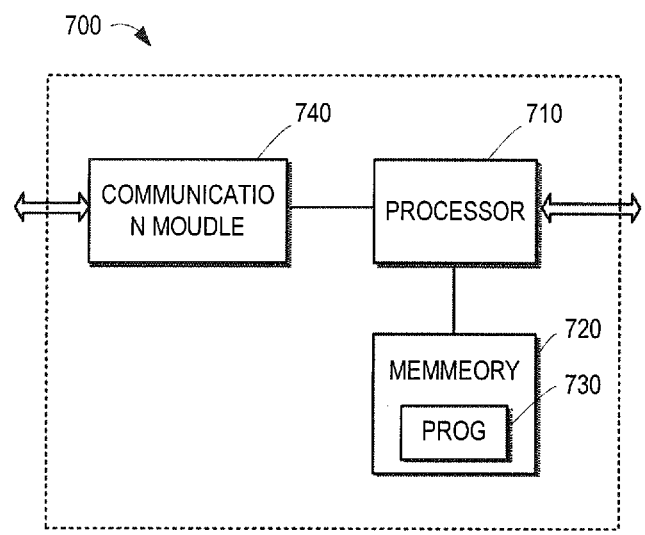
FIG. 7 schematically illustrates a simplified block diagram of a device that is suitable for implementing embodiments regarding joint allocation of transmission power and time resource of the present disclosure.

FIG. 7 further illustrates a simplified block diagram of a device 700 that is suitable for implementing embodiments of the present disclosure. The device 700 can be implemented at or as at least a part of a network device like TRP in for example a 5G communication system.

As shown, the device 700 includes a processor 710, a memory 720 coupled to the processor 710, a communication module 740 coupled to the processor 710, and a communication interface (not shown) coupled to the communication module 740. The memory 710 stores at least a program 730. The communication module 740 is for bidirectional communications. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a UE.

The program 730 is assumed to include program instructions that, when executed by the associated processor 710, enable the device 700 to operate in accordance with the embodiments of the present disclosure, as discussed herein with reference to FIGS. 3-6. The embodiments herein may be implemented by computer software executable by the processor 710 of the device 700, or by hardware, or by a combination of software and hardware. The processor 710 may be configured to implement various embodiments of the present disclosure.

The memory 710 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 710 is shown in the device 700, there may be several physically distinct memory modules in the device 700. The processor 710 may be of any type suitable to the local technical network, and may include one or more of general purpose computers, special purpose computers, microprocessors, digital signal processors (DSPs) and processors based on multicore processor architecture, as non-limiting examples. The device 700 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 as described above with reference to FIGS. 3-6. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method, comprising:
   at a network device,
   determining, for terminal devices served by the network device, a minimum time resource assignment of uplink and downlink transmissions required by their respective given traffic demands under a given time resource configuration and a given bandwidth configuration;
   determining an optimal time resource assignment of the uplink and downlink transmissions for their respective given traffic demands under the given bandwidth configuration based on the minimum time source assignment by means of an optimal incremental method; and
   determining an optimal transmission power assignment of the uplink and downlink transmissions based on the optimal time resource assignment,
   wherein the determining a minimum time resource assignment of uplink and downlink transmissions comprises determining minimum numbers of uplink basic scheduling time units and minimum numbers of downlink basic scheduling time units for the terminal devices meeting their respective given traffic demands in case of the terminal devices and the network device using their respective maximum transmission powers under the given bandwidth configuration, so that a sum of the minimum numbers of uplink basic scheduling time units and the numbers of downlink basic scheduling time units meets the constraint of time resource configuration.

2. The method of claim 1, wherein the determining a minimum time resource assignment of uplink and downlink transmissions comprises:
   adjusting the given bandwidth configuration for at least part of the uplink and downlink transmissions to reduce basic scheduling time units assigned thereto to meet the constraint of time resource configuration under the adjusted given bandwidth configuration; and
   determining a new minimum time resource assignment of the uplink and downlink transmissions for the terminal devices under the adjusted given bandwidth configuration.

3. The method of claim 1, wherein the determining an optimal transmission power assignment of the uplink and downlink transmissions further comprises:
   determining transmission power values of the uplink and downlink transmissions for the terminal devices meeting their respective given traffic demand in case of the terminal devices using the optimal time resource assignment of the uplink and downlink transmissions, as the optimal transmission power assignment.

4. The method of claim 1, further comprising:
   transmitting a transmission resource configuration indicating the determined optimal time resource assignment and the optimal transmission power assignment.

5. A non-transitory computer readable storage medium storing a computer program thereon, the computer program, when executed by a processor, causing the processor to carry out the method according to claim 1.

6. A method comprising:
   at a network device,
   determining, for terminal devices served by the network device, a minimum time resource assignment of uplink and downlink transmissions required by their respective given traffic demands under a given time resource configuration and a given bandwidth configuration;
   determining an optimal time resource assignment of the uplink and downlink transmissions for their respective given traffic demands under the given bandwidth configuration based on the minimum time source assignment by means of an optimal incremental method; and
   determining an optimal transmission power assignment of the uplink and downlink transmissions based on the optimal time resource assignment,
   wherein the determining an optimal time resource assignment of the uplink and downlink transmissions comprises:
   for each of remaining basic scheduling time units in the given time resource configuration, allocating it to a transmission link of a terminal device which could achieve a desirable decrement in power consumption due to increment of the allocated basic scheduling time unit.

7. The method of claim 6, wherein the determining an optimal time resource assignment of the uplink and downlink transmissions further comprises:
   determining incremental sequences for the uplink and downlink transmissions for the terminal devices, which indicate incremental gains in power consumption respectively corresponding to the remaining basic scheduling time units; and
   for a remaining basic scheduling time units as an incremental scheduling time unit,
   determining a set of values of the incremental sequences of the uplink and downlink transmissions for the terminal devices;
   determining a minimum value among the set of values of the incremental sequences; and
   determining a transmission link associated with a terminal device corresponding to the minimum value as the transmission link of the terminal device to which the incremental scheduling time unit is to be allocated.

8. A network device comprising:
at least one processor; and
at least one memory including computer program code;
the at least one memory and the computer program code configured to, with the at least one processor, cause the network device to:
determine, for terminal devices served by the network device, a minimum time resource assignment of uplink and downlink transmissions required by their respective given traffic demands under a given time resource configuration and a given bandwidth configuration;
determine an optimal time resource assignment of the uplink and downlink transmissions for their respective given traffic demands under the given bandwidth configuration based on the minimum time source assignment by means of an optimal incremental method; and
determine an optimal transmission power assignment of the uplink and downlink transmissions based on the optimal time resource assignment,
wherein the determining a minimum time resource assignment of uplink and downlink transmissions comprises determining minimum numbers of uplink basic scheduling time units and minimum numbers of downlink basic scheduling time units for the terminal devices meeting their respective given traffic demands in case of the terminal devices and the network device using their respective maximum transmission powers under the given bandwidth configuration, so that a sum of the minimum numbers of uplink basic scheduling time units and the numbers of downlink basic scheduling time units meets the constraint of time resource configuration.

9. The network device of claim 8, wherein the determining a minimum time resource assignment of uplink and downlink transmissions comprises:
adjusting the given bandwidth configuration for at least part of the uplink and downlink transmissions to reduce basic scheduling time units assigned thereto to meet the constraint of time resource configuration under the adjusted given bandwidth configuration; and
determining a new minimum time resource assignment of the uplink and downlink transmissions for the terminal devices under the adjusted given bandwidth configuration.

10. The network device of claim 8, wherein the determining an optimal transmission power assignment of the uplink and downlink transmissions further comprises:
determining transmission power values of the uplink and downlink transmissions for the terminal devices meeting their respective given traffic demand in case of the terminal devices using the optimal time resource assignment of the uplink and downlink transmissions, as the optimal transmission power assignment.

11. The network device of claim 8, wherein the network device is further caused to:
transmit a transmission resource configuration indicating the determined optimal time resource assignment and the optimal transmission power assignment.

12. A network device comprising:
at least one processor; and
at least one memory including computer program code;
the at least one memory and the computer program code configured to, with the at least one processor, cause the network device to:
determine, for terminal devices servce by the network device, a minimum time resource assignment of uplink and downlink transmissions required by their respective given traffic demands under a given time resource configuration and a given bandwidth configuration;
determine an optimal time resoure assignment of the uplink and downlink transmissions for their respective given traffic demands under the given bandwidth configuration based on the minimum time source assignment by means of an optimal incremental method; and
determine an optimal transmission power assignment of the uplink and downlink transmissions based on the optimal resource assignment,
wherein the determining an optimal time resource assignment of the uplink and downlink transmissions comprises:
for each of remaining basic scheduling time units in the given time resource configuration, allocating it to a transmission link of a terminal device which could achieve a desirable decrement in power consumption due to the increment of the allocated basic scheduling time unit.

13. The network device of claim 12, wherein the determining an optimal time resource assignment of the uplink and downlink transmissions further comprises:
determining incremental sequences for the uplink and downlink transmissions for the terminal devices, which indicate incremental gains in power consumption respectively corresponding to remaining basic scheduling time units; and
for a remaining basic scheduling time units as an incremental scheduling time unit,
determining a set of values of the incremental sequences of the uplink and downlink transmissions for the terminal devices;
determining a minimum value among the set of values of the incremental sequences; and
determining a transmission link associated with a terminal device corresponding to the minimum value as the transmission link of the terminal device to which the incremental scheduling time unit is to be allocated.

* * * * *